United States Patent
Nappier et al.

(10) Patent No.: US 6,468,494 B2
(45) Date of Patent: Oct. 22, 2002

(54) PROCESS FOR PREPARING METAL NITRATES FROM THE CORRESPONDING METALS

(75) Inventors: Thomas E. Nappier, Rocky River; Alex T. Magdics, Highland Hts., both of OH (US)

(73) Assignee: OM Group, Inc., Cleveland, OH (US)

( * ) Notice: Subject to any disclaimer, the term of this patent is extended or adjusted under 35 U.S.C. 154(b) by 28 days.

(21) Appl. No.: 09/726,067

(22) Filed: Nov. 29, 2000

(65) Prior Publication Data

US 2002/0122763 A1 Sep. 5, 2002

(51) Int. Cl.$^7$ ............................................. C01B 21/48
(52) U.S. Cl. ....................................... 423/395
(58) Field of Search ......................................... 423/395

(56) References Cited

U.S. PATENT DOCUMENTS

| | | | |
|---|---|---|---|
| 2,053,518 A | * 9/1936 | Crittenden | 423/395 |
| 2,581,518 A | 1/1952 | Critchley | 23/102 |
| 2,581,519 A | 1/1952 | Critchley | 23/102 |
| 4,305,846 A | 12/1981 | Jennings | 252/470 |
| 4,808,393 A | 2/1989 | Lewchalermwong | 423/395 |
| 5,039,502 A | 8/1991 | Horn et al. | 423/395 |
| 5,516,408 A | 5/1996 | Peckham et al. | 205/580 |

FOREIGN PATENT DOCUMENTS

RU 126482 12/1959

OTHER PUBLICATIONS

Filimonenko et al, "Investigation of Process of Obtaining Nickelous Nitrate", The Soviet Chemical Industry, No. 2; 100–102; Feb. 1972.
Dorofeeva et al, "Production of Nickel Nitrate", The Soviet Chemical Industry, No. 8, 603–6 (1974). (no month).

* cited by examiner

Primary Examiner—Wayne A. Langel
(74) Attorney, Agent, or Firm—Renner, Otto, Boisselle & Sklar

(57) ABSTRACT

The invention relates to a process for preparing metal nitrates from the corresponding metal wherein the metal is selected from silver, cadmium, bismuth and the metals of atomic number 24–30. The process comprises (A) providing a reactor containing (a) the metal, (b) nitric acid, and (c) water wherein the initial concentration of the nitric acid in the water in the reactor is from about 50% to about 80% by weight, and the reactor is free of (1) added fuming nitric acid, (2) added chromium compounds when the metal is iron, and (3) added oxygen, and when the metal is nickel the reactor contains less than 500 g/l of any added nickel nitrate hexahydrate, and (B) maintaining the temperature within the reactor at a temperature to facilitate the formation of the metal nitrate and to maintain the produced metal nitrate in the molten state; (C) maintaining the pressure within the reactor at between atmospheric pressure up to about 100 psig; and (D) recovering the metal nitrate from the reactor, provided that when the metal is iron, any recovered iron nitrate is not recycled. The process of the present invention results in the formation of metal nitrates and more particularly aqueous solutions of metal nitrates containing reduced amounts of ammonium nitrate.

52 Claims, No Drawings

PROCESS FOR PREPARING METAL NITRATES FROM THE CORRESPONDING METALS

FIELD OF THE INVENTION

This invention relates to process for preparing metal nitrates. More particularly, the invention relates to a process for preparing metal nitrates from the corresponding metal wherein the metal is silver, cadmium, bismuth or one of the metals of atomic numbers 24–30.

BACKGROUND OF THE INVENTION

Metal catalysts, such as nickel and cobalt catalysts, are commercially prepared from the corresponding metal nitrate. Aqueous metal nitrate solutions have been prepared in the art by dissolving the metal in nitric acid. When the metal is reacted with nitric acid, considerable amounts of ammonium nitrate are formed as a contaminant as a result of uncontrollable side reactions. When metal nitrate solutions containing significant amounts of ammonium nitrate are utilized to form metal catalysts, the ammonium nitrate must be separated prior to use of the metal nitrate by means of complex and expensive purification processes, or the contaminated metal nitrate is utilized in the catalyst preparation requiring the discharge of large amounts of ammonia in the waste system.

One method for avoiding the formation of ammonium nitrate involves utilization of a metal oxide or metal carbonate as the starting material rather than the metal. Reaction of nitric acid with metal oxides or metal carbonates produces metal nitrate solutions which are free of ammonium nitrate. However, the starting materials, namely, metal oxides and metal carbonates are generally substantially more expensive than the free metal, and also generally of lower purity than a metal obtained for example, by electrolytic deposition or by decomposition of a metal carbonyl.

When nitric acid is reacted with a metal such as nickel, at least five competing reactions can occur:

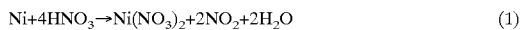
$$Ni + 4HNO_3 \rightarrow Ni(NO_3)_2 + 2NO_2 + 2H_2O \quad (1)$$

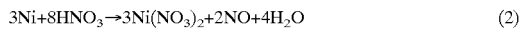
$$3Ni + 8HNO_3 \rightarrow 3Ni(NO_3)_2 + 2NO + 4H_2O \quad (2)$$

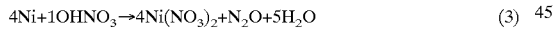
$$4Ni + 10HNO_3 \rightarrow 4Ni(NO_3)_2 + N_2O + 5H_2O \quad (3)$$

$$4Ni + 10HNO_3 \rightarrow 4Ni(NO_3)_2 + NH_4NO_3 + 3H_2O \quad (4)$$

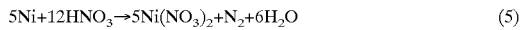
$$5Ni + 12HNO_3 \rightarrow 5Ni(NO_3)_2 + N_2 + 6H_2O \quad (5)$$

As can be seen from the above equations, in addition to the desired nickel nitrate, ammonium nitrate and various nitrogen oxides are formed in the reaction. However, the presence of the nitrogen oxides is not as significant a problem as the presence of ammonium nitrate. Thus, it is desirous to develop a procedure for preparing metal nitrates from the metal and nitric acid which suppresses or significantly reduces the extent of reaction 4.

A process for preparing nickel nitrate from nickel and nitric acid is described in the Russian Journal of Inorganic Chemistry 1959, 11, 1122. The authors recommend adding 30% hydrogen peroxide to the reaction mixture. Based upon the ammonium nitrate, at least stoichiometric amounts of hydrogen peroxide are required, and significant amounts of hydrogen peroxide are consumed under the reaction conditions due to decomposition.

It has also been suggested in Dorofeeva et al, Khim Prom-st. (Moscow) 1974, (8), 603–6, Chem. Abs. 81, 172286 m (1974) that the formation of ammonium nitrate can be suppressed during the reaction of nickel with nitric acid by adding metallic copper to the nickel to be dissolved or by using copper-containing nickel for the reaction with nitric acid. A disadvantage of this process, however, is that the nickel nitrate solution obtained is contaminated with copper nitrate which must be removed using additional purification steps.

In USSR Patent 126,482, Mar. 1, 1960, a procedure for preparing nickel nitrate is described which involves continuously dissolving metallic nickel in nitric acid containing 700 to 1000 g/l of nickel nitrate hexahydrate. It is suggested that this procedure prevents the formation of undesirable ammonium nitrate and the corrosive NO and $NO_2$. The process is automatically regulated by the residual concentration of nitric acid in the final solution which must be no more than 1 gram per liter.

A process for the preparation of aqueous metal nitrate solutions by dissolving the metal and nitric acid is described in U.S. Pat. No. 5,039,502 (Horn et al). The formation of ammonium nitrate is reported to be reduced by adding nitrous acid or a substance which forms nitrous acid to the reaction medium. Generally, the reaction is conducted at elevated pressure, and pressures of from 0.1 to 10 MPa are described as being useful, particularly to prevent decomposition of the nitrous acid. This patent describes the preparation of the nitrates of the elements having the atomic numbers 24 to 28 which are iron, chromium, manganese, cobalt and nickel.

U.S. Pat. No. 4,808,393 describes the process for the manufacture of aqueous ferric nitrate solution. The process is reported to overcome the passivation problem associated with the reaction of nitric acid and iron. The process involves continuously gravity-flowing nitric acid through a bed of pieces of metallic iron at a critical reaction temperature less than the ferric nitrate-to-ferric oxide decomposition temperature, and then recycling the effluent through the bed of iron pieces. The effluent is increasingly enriched in ferric nitrate and depleted in unreacted nitric acid by the recycling.

U.S. Pat. No. 2,581,519 also describes the manufacture of metal nitrate by the reaction of nitric acid with a metal such as silver or bismuth. The reaction takes place in an atmosphere of oxygen or a gas consisting mainly of oxygen which replaces the oxygen used in converting the evolved nitrogen oxides directly to nitric acid. Oxygen is introduced into the reaction vessel to expel all of the air from the vessel.

SUMMARY OF THE INVENTION

The invention relates to a process for preparing metal nitrates from the corresponding metal wherein the metal is selected from silver, cadmium, bismuth and the metals of atomic number 24–30. The process comprises
  (A) providing a reactor containing
    (a) the metal,
    (b) nitric acid, and
    (c) water
      wherein the initial concentration of the nitric acid in the water in the reactor is from about 50% to about 80% by weight, and the reactor is free of
      (1) added fuming nitric acid,
      (2) added chromium compounds when the metal is iron, and
      (3) added oxygen, and
    when the metal is nickel, the reactor contains less than 500 g/l of any added nickel nitrate hexahydrate;
  (B) maintaining the temperature within the reactor at a temperature to facilitate the formation of the metal nitrate and to maintain the produced metal nitrate in the molten state;

(C) maintaining the pressure within the reactor at between atmospheric pressure up to about 100 psig; and (D) recovering the metal nitrate from the reactor, provided that when the metal is iron, any recovered iron nitrate is not recycled.

The process of the present Invention results in the formation of metal nitrates and more particularly aqueous solutions of metal nitrates containing reduced amounts of ammonium nitrate.

DESCRIPTION OF THE PREFERRED EMBODIMENTS

The metal nitrates which can be prepared by the process of the present invention include silver nitrate, cadmium nitrate, bismuth nitrate, and the nitrates of the metals of atomic numbers 24–30 which are chromium nitrate, manganese nitrate, iron nitrate, cobalt nitrate, nickel nitrate, copper nitrate and zinc nitrate. In one embodiment of the present invention, the metal nitrates are nickel nitrate and cobalt nitrate. It is also possible to utilize mixtures of the above-identified metals. However, if it is desired to prepare a mixture of metal nitrate solutions, it is generally easier to dissolve the metal separately in nitric acid and subsequently to mix the finished metal nitrate solutions in the desired ratio. The metal which is to be reacted with the nitric acid can be in various physical forms such as in powder form or in larger pieces such as cathode plates and broken cathode plates. When the metal is too finely divided, there is the disadvantage of the formation of undesired metal dust, and when the reaction is conducted in the vertical reactor, undesired metal packing may result. Thus, the use of larger metal particles such as microspheres, granules, electrode cuttings, brochets or crowns is preferred.

The nitric acid utilized in the process of the invention generally has a concentration of at least 50% up to about 80% by weight, and more often, a concentration of nitric acid of at least about 60% up to about 80% by weight. Concentrations of from about 65% to about 70% by weight of nitric acid have been found to be particularly useful.

The metal can be reacted with the nitric acid in either a batch process or in a continuous process. In one embodiment of a batch process, the metal to be dissolved is placed in a reactor, and the nitric acid is added gradually, such as by dripping or spraying, at a rate to control the rate of the reaction. Alternatively, the metal and water can be placed in the reactor, and concentrated nitric acid is added gradually to the reactor. It also is possible to charge the metal, nitric acid and water to the reactor all at once although control of the reaction may be more difficult with some metals.

In one embodiment, the process of the present invention is a continuous process wherein the metal is contained in a reactor such as a vertical reactor having a top opening and a bottom opening wherein the reactor contains a bed of pieces of the metal. The concentrated nitric acid is added, for example, by dripping or spraying into the top of the reactor whereby the nitric acid flows through the bed of metal pieces and the contact time between the nitric acid and the metal pieces is sufficient to form the metal nitrate. The reactor is maintained at a temperature which is sufficient to promote the reaction and maintain the metal nitrate in the molten state so that it will not solidify as it is formed in the reactor. The desired metal nitrate is then recovered from the bottom opening of the reactor.

The reaction, as noted above, generally is carried out at a temperature which is sufficient to maintain the produced metal nitrate in the molten state until the molten metal nitrate can be diluted with water. Thus, the reaction temperature will be determined at least in part on the temperature at which the metal nitrate tends to solidify. Generally, temperatures are from about 50° C. to about 150° C., and temperatures of from about 60° C. to about 90° C. also are useful. The reaction between the metal and nitric acid may be conducted at atmospheric pressure, although the reaction can be conducted at slight pressures such as from atmospheric pressure up to about 100 psig. In other embodiments, the reaction can be conducted at pressures of from atmospheric pressure up to about 25 psig or even 50 psig. In some instances, conducting the reaction at these slight pressures results in reduced production of ammonium nitrate as an impurity. The pressure generally is generated by the formation of reaction gases.

When the process of the invention is to be conducted in a continuous or semi-continuous manner, vertical reactors, and more particularly, vertical tubular reactors are desirable. The design of the reactor is not critical, and a variety of vertical reactors can be utilized provided that the reactor allows sufficient contact between the nitric acid and the metal to produce the desired metal nitrate within the reactor. In one embodiment, the height of the reactor may range from about 3 feet to about 30 feet, and the diameter of the reactors may vary from between about 3 inches to about 12 inches or more. The height of the bed of metal in the reactors may range from about 2 to about 20 feet, and in other embodiments may range from about 10 to about 12 feet.

In one embodiment, the molten metal nitrate which is formed in the reactor is recovered and solidified by cooling. The cooling process can be controlled to produce the solid product in various forms such as flakes, powders, pellets, etc.

In another embodiment, the molten metal nitrate which is formed in the reactor (either in a batch, continuous or semi-continuous process) is diluted with water before the molten metal nitrate is cooled to a solid. In a batch process, water may be added to the reactor containing the molten metal nitrate or the metal nitrate may be added to a container containing water. When the metal nitrate is formed in a vertical reactor, water may be added to the molten nitrate in the reactor as the nitrate exits from the bed of metal, or water can be added to the molten nitrate upon removal from the reactor and prior to cooling. The amount of water added to the molten metal nitrate is generally an amount sufficient to provide a solution wherein the metal nitrate does not crystallize when the solution is cooled to ambient temperature. In one embodiment, sufficient water is added to provide a metal nitrate solution containing from about 10 to about 20% by weight of metal, and more often, from about 11 to about 15% by weight of metal.

In addition to containing the desired concentration of metal nitrate, the aqueous metal nitrate solutions obtained by the process of the invention will contain only small amounts of unreacted nitric acid. In one embodiment, the aqueous metal nitrate solutions will contain less than about 10% or less than about 5% by weight of nitric acid, and in other embodiments, the aqueous metal nitrate solutions may contain less than about 1% or 2% by weight of nitric acid. In yet another embodiment, the aqueous metal nitrate solutions obtained by the process of this invention may contain less than about 0.01% by weight of unreacted nitric acid.

The metal nitrate solutions prepared in accordance with the process of the present invention, particularly the continuous processes described herein, contain reduced amounts of ammonium nitrate. Metal nitrate solutions having an average adjusted ammonia concentration of less than 1000 ppm of ammonia, or less than 500 ppm, or even less than 100 ppm or 50 ppm of ammonia can be obtained. The average adjusted ammonia concentration is calculated as if the product solution contained 15% w metal as metal nitrate and to account for added water. The solution from the process can contain up to about 20% w or more of metal before dilution to prevent solidification. After this dilution to about 15% w metal, the residual concentration of ammonia can be 50 ppm or lower. Ammonia nitrate production, in some embodiments, also is reduced when the reaction is conducted in the presence of air and in the absence of any added oxygen. In some instances, metal nitrates with reduced ammonium nitrate are obtained when the pressure in the reactor is above atmospheric such as, for example, at 25 or 50 psig.

In one embodiment, the process of the present invention relates to the preparation of metal nitrates from the corresponding metal wherein the metal is selected from silver, cadmium, bismuth or the metals of atomic numbers 24–30, wherein the process comprises (A) providing a reactor containing
  (a) the metal,
  (b) nitric acid, and
  (c) water
    wherein the initial concentration of the nitric acid in the water in the reactor is from about 50% to about 80% by weight, and the reactor is free of
    (1) added fuming nitric acid,
    (2) added chromium compounds when the metal is iron, and
    (3) added oxygen, and
      when the metal is nickel, the reactor contains less than 500 g/l of any added nickel nitrate hexahydrate;
(B) maintaining the temperature within the reactor at a temperature to facilitate the formation of the metal nitrate and to maintain the produced metal nitrate in the molten state;
(C) maintaining the pressure within the reactor at between atmospheric pressure up to about 100 psig; and
(D) recovering the metal nitrate from the reactor, provided that when the metal is iron, any recovered iron nitrate is not recycled.

In one embodiment of the above process, the reactor is free of any added nitrous acid or free of material which forms nitrous acid such as fuming nitric acid. In the process of the invention, the reactor is essentially free of any added oxygen which includes air as well as pure oxygen. When the metal is nickel or cobalt, no air or oxygen is added, and in one embodiment, any air that is present at the beginning of the reaction is flushed out of the reactor. Alternatively no air or oxygen is added, and any air or oxygen present at the beginning of the process is quickly consumed (burned). In another embodiment, the metal utilized in the above process is nickel or cobalt, and when the metal is nickel, the reactor contains less than 500 g/l or even less than 100 g/l of any added nickel nitrate hexahydrate. In one embodiment, when the metal is nickel the reactor is essentially free of any added nickel nitrate hexahydrate. The phrase "initial concentration" of the nitric acid as used in the written description and appended claims refers to, in the case of batch processes, to the overall concentration of nitric acid in the water in the reactor at the beginning of the reaction. Thus, for example, if separate additions of two or more different concentrations of nitric acid are added to a reactor, "initial concentration" is the overall concentration achieved by the two or more additions. In a continuous process, the phrase refers to the overall concentration of nitric acid in water added to the reactor on a continuous or semi continuous manner. The term "free of" as used in the written description and appended claims is not intended to exclude minor amounts of the stated material which may be present in amounts of less than 1% or even less than 0.1%, such as, for example materials that are present as impurities.

In another embodiment, the process of the present invention relates to the preparation of metal nitrates from the corresponding metal wherein the metal is selected from nickel and cobalt, and the process comprises the steps of (A) providing a reactor containing
  (a) the metal,
  (b) nitric acid, and
  (c) water
    wherein the initial concentration of the nitric acid in the water in the reactor is from about 50% to about 80% by weight, the reactor is free of any added fuming nitric acid, and when the metal is nickel the reactor contains less than 500 g/l, or less than 100 g/l of any added nickel nitrate hexahydrate;
(B) maintaining the temperature within the reactor at a temperature to facilitate the formation of the metal nitrate and to maintain the produced metal nitrate in the molten state;
(C) maintaining the pressure within the reactor at between atmospheric pressure up to about 100 psig; and
(D) recovering the molten metal nitrate from the reactor.

The molten metal nitrate that is recovered may be allowed to solidify as described above, or the molten metal nitrate can be diluted with water to form a solution and avoid solidification.

When the above process is a batch process, the reactor initially may be provided with metal, and the nitric acid and water may be added as an aqueous nitric acid solution to the metal at a rate which is sufficient to control the rate of the reaction. The temperature of the reaction also can be controlled by the rate of addition of the nitric acid. When the metal is nickel, the reactor is free of any added nickel nitrate hexahydrate.

In yet another embodiment, the process of the present invention for preparing metal nitrates from the corresponding metal is a continuous process which comprises (A) providing a vertical reactor having a top opening and a bottom opening wherein the reactor contains a bed of pieces of the metal;
(B) feeding an aqueous nitric acid solution which contains less than 500 g/l, more often less than 100 g/l of added nickel nitrate hexahydrate when the metal is nickel, and which solution contains at least 50% nitric acid but is free of fuming nitric acid into the top opening of the reactor whereby the nitric acid flows through the bed of metal pieces, and the contact time between the nitric acid and the metal pieces is sufficient to form the metal nitrate;
(C) maintaining the temperature within the reactor at a temperature sufficient to maintain the metal nitrate in the molten state;
(D) maintaining the pressure within the reactor at between about atmospheric pressure up to about 100 psig; and
(E) recovering the metal nitrate from the bottom opening of the reactor, provided that when the metal is iron, any recovered iron nitrate is not recycled.

As mentioned above, the reactor may be a vertical tubular reactor which may range in height from about 3 feet to about 30 feet, and the diameter of the reactors may vary from between about 3 inches to about 12 inches or more. The height of the bed of metal in the reactor is generally less than the height of the reactor, and thus, in one embodiment, the height of the bed of metal in the reactor may range from about 2 to about 20 feet, and in other embodiments, from about 12 to 12 feet.

In yet another embodiment, the process of the present invention is a continuous process for preparing metal nitrates from the corresponding metal wherein the metal is nickel or cobalt, and the process comprises (A) providing a vertical reactor having a top opening and a bottom opening wherein the reactor contains a bed of pieces of the metal;

(B) feeding an aqueous nitric acid solution which is free of nickel nitrate hexahydrate when the metal is nickel and containing from about 50% to about 80% nitric acid into the top opening of the reactor whereby the nitric acid flows through the bed of metal pieces and the contact time between the nitric acid and the metal pieces is sufficient to form the metal nitrate;

(C) maintaining the temperature within the reactor at a temperature sufficient to maintain the metal nitrate in the molten state;

(D) maintaining the pressure within the reactor at between about atmospheric pressure up to about 50 psig; and (E) recovering the metal nitrate from the bottom opening of the reactor.

As mentioned previously, in one embodiment, the nitric acid which is fed to the reactor is free of nitrous acid or materials that can form nitrous acid.

The following examples illustrate the process of the present invention. Unless otherwise indicated in the following examples, in the specification or in the claims, all parts and percentages are by weight, temperatures are in degrees celsius, and pressure is at or near atmospheric pressure.

EXAMPLES 1A to 1D

These examples are conducted in a vertical tubular reactor which is prepared using a 14-foot stainless steel cylinder which has an internal diameter of four inches. The reactor is insulated and heated, via copper heating coils, and the insulated portion of the column is packed with a bed of generally spherical nickel pellets (6–20 mm, 99.99% nickel) purchased from INCO. Water at 70° C. is circulated through the copper coils of the reactor to preheat the reactor before the process is started. Nitric acid (approximately 67% by weight) is trickled over the nickel pellets, and the nitric acid reacts with the nickel pellets as the nitric acid passes through the bed.

This reactor is operated continuously for different periods, namely, for 8, 12, 13 and 25 hour runs. All runs are at atmospheric pressure with varying flow rates as indicated in the table below. Water is added to the reactor underneath the bed of nickel to dissolve the molten nickel nitrate and minimize crystallization. Sufficient water is added to provide a final diluted product containing around 11–14% nickel, as nickel nitrate. The details regarding the process parameters of these four examples and the product solutions obtained are summarized in the following Table I.

TABLE 1

| | Examples | | | |
|---|---|---|---|---|
| | 1A | 1B | 1C | 1D |
| Reaction Parameters | | | | |
| Measured Nitric acid flow rate (g min) | 50 | 80 | 133 | 133 |
| Nickel bed height (ft.) | 11 | 9 | 8 | 10 |
| Running time (hrs.) | 8 | 12 | 13 | 25 |
| Product Solutions | | | | |
| % w Ni | 11–13 | 11–13 | 11–13 | 12–14 |
| Adjusted $NH_3$ conc. (ppm)* | 20 | 75 | 105 | 42 |
| Average residual $HNO_3$ (%) | 1.4 | 1.4 | 1.4 | 1.2 |

*adjusted to account for added water; calculated as if product solution contained 15% w nickel as nickel nitrate

EXAMPLES 2A and 2B

A reactor is prepared which is similar to the reactor utilized in Examples 1A to 1D except that the reactor is 6 feet tall, 4 feet of which is insulated and equipped with a jacket. The cylinder utilized in these examples is 6 inches in diameter. The insulated portion of the column is packed with a bed of nickel pellets, and water is circulated through the jacket to preheat the reactor before the process is started and to maintain the reaction product in the molten condition. Nitric acid (approximately 67% by weight) is sprayed over the nickel pellets allowing the nitric acid to react with the nickel as it passes through the bed. Water is added to the reactor beneath the bed of nickel to form a solution of the molten nickel nitrate and to assure that the nickel nitrate does not crystallize as the solution is allowed to cool.

This reactor is operated continuously for 26.5 hours when some freezing is noticed at the product exit line. After a three hour delay the reaction is continued for another 16 hours. For the first portion of the experiment, the reactor is operated at 20–25 psig in an atmosphere of reaction gases, and during the second part of the reaction, the pressure and the reactor is maintained between 15 and 20 psig. Water is added to the reactor beneath the bed of nickel to dissolve the molten nickel nitrate product and minimize crystallization. Sufficient water is added to provide a final diluted product containing 15% w nickel. The reaction parameters as well as the analytical results for the product solutions obtained in the first portion (2A) and the second portion (2B) of the experiment are summarized in the following Table 2.

TABLE 2

| | 2A | 2B |
|---|---|---|
| Reaction Parameters | | |
| Pressure (psig) | 20–25 | 15–20 |
| Nitric acid flow rate (g/min) | 18 | 30 |
| Running time (hrs) | 26.5 | 16 |
| Product Solutions | | |
| % w Ni | 12.0 | 12.8 |
| Adjusted $NH_3$ conc. (ppm) @ 15% Ni | 91 | 59 |
| Average residual nitric acid | 5.1 | 5.1 |

The metal nitrates and metal nitrate solutions prepared by the process of the invention can be used in a preparation of support-free or support-containing catalysts. Nickel nitrate is particularly suitable for the preparation of hydrogenation catalysts. Cobalt nitrate is useful for preparing oxidation catalysts. Hydro disulfurization catalysts can be prepared from either nickel nitrate or cobalt nitrate.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for preparing metal nitrates from the corresponding metal wherein the metal is silver, cadmium, bismuth or the metals of atomic numbers 24–30, wherein the process comprises
    (A) providing a reactor containing
        (a) the metal,
        (b) nitric acid, and
        (c) water
            wherein the initial concentration of the nitric acid in the water in the reactor is from 50% to about 80% by weight, and the reactor is free of
            (1) added fuming nitric acid,
            (2) added chromium compounds when the metal is iron, and
            (3) added oxygen, and
                when the metal is nickel, the reactor contains less than 500 g/l of any added nickel nitrate hexahydrate,
    (B) maintaining the temperature within the reactor at a temperature to facilitate the formation of the metal nitrate and to maintain the produced metal nitrate in the molten state;
    (C) maintaining the pressure within the reactor at between atmospheric pressure up to about 100 psig; and
    (D) recovering the metal nitrate from the reactor, provided that when the metal is iron, any recovered iron nitrate is not recycled.

2. The process of claim 1 wherein the metal is nickel or cobalt.

3. The process of claim 1 wherein the metal is nickel and the reactor contains less than 100 g/l of added nickel nitrate hexahydrate.

4. The process of claim 1 wherein the reactor is free of any added nitrous acid or material which forms nitrous acid.

5. The process of claim 1 wherein the reactor is initially provided with the metal, and the nitric acid and water are added to the reactor by spraying or dripping to control the reaction rate.

6. The process of claim 1 wherein the pressure within the reactor is maintained at about atmospheric pressure.

7. The process of claim 1 wherein the concentration of nitric acid in the water in the reactor is at least about 60% by weight.

8. The process of claim 1 wherein the temperature within the reactor is maintained at from about 60° C. to about 90° C.

9. A process for preparing metal nitrates from the corresponding metal wherein the metal is nickel or cobalt which comprises:
    (A) providing a reactor containing
        (a) the metal,
        (b) nitric acid, and
        (c) water
            wherein the initial concentration of the nitric acid in the water in the reactor is from 50% to about 80% by weight, and the reactor is free of any added fuming nitric acid and when the metal is nickel the reactor contains less than 500 g/l of any added nickel nitrate hexahydrate;
    (B) maintaining the temperature within the reactor at a temperature to facilitate the formation of the metal nitrate and to maintain the produced metal nitrate in the molten state;
    (C) maintaining the pressure within the reactor at between atmospheric pressure up to about 100 psig; and
    (D) recovering the molten metal nitrate from the reactor.

10. The process of claim 9 wherein the recovered molten metal nitrate is solidified.

11. The process of claim 9 wherein the recovered molten metal nitrate is dissolved in water to form a solution.

12. The process of claim 9 wherein the reactor is initially provided with the metal, and the nitric acid and water are added to the reactor by spraying or dripping to control the reaction rate.

13. The process of claim 9 wherein the metal is nickel, and the reactor is free of any added nickel nitrate hexahydrate.

14. The process of claim 9 wherein the pressure is maintained at from about atmospheric pressure up to about 50 psig.

15. A process for preparing metal nitrates from the corresponding metal wherein the metal is nickel or cobalt which comprises:
    (A) providing a reactor containing
        (a) the metal,
        (b) nitric acid, and
        (c) water
            wherein the initial concentration of the nitric acid in the water in the reactor is about 60% to about 80% by weight and when the metal is nickel the reactor contains less than 500 g/l of any added nickel nitrate hexahydrate;
    (B) maintaining the temperature within the reactor at a temperature to facilitate the formation of the metal nitrate and to maintain the produced metal nitrate in the molten state;
    (C) maintaining the pressure within the reactor at between atmospheric pressure up to about 100 psig; and
    (D) recovering the molten metal nitrate from the reactor.

16. The process of claim 15 wherein the reactor is initially provided with the metal, and the nitric acid and water are added to the reactor by spraying or dripping to control the reaction rate.

17. The process of claim 15 wherein the metal is nickel, and the reactor is free of any added nickel nitrate hexahydrate.

18. The process of claim 15 wherein the pressure is maintained between atmospheric pressure up to about 50 psig.

19. The process of claim 15 wherein the pressure is maintained at about atmospheric pressure.

20. The process of claim 15 wherein the concentration of nitric acid in the water in the reactor is from about 65% to about 70% by weight.

21. The process of claim 15 wherein the temperature within the reactor is maintained at about 60° to about 90° C.

22. The process of claim 15 wherein the nitric acid reacts with the metal in the presence of air.

23. The process of claim 15 wherein water is added to the metal nitrate recovered in (D) to form a metal nitrate solution and minimize solidification of the metal nitrate.

24. A continuous process for preparing metal nitrates containing reduced amounts of ammonium nitrate from the corresponding metal, wherein the metal is silver, cadmium, bismuth or the metals of atomic numbers 24–30 which comprises:

(A) providing a vertical reactor having a top opening and a bottom opening wherein the reactor contains a bed of pieces of the metal;

(B) feeding an aqueous nitric acid solution which contains less than 500 g/l of any added nickel nitrate hexahydrate when the metal is nickel, and which solution contains at least about 50% nitric acid but is free of fuming nitric acid into the top opening of the reactor whereby the nitric acid flows through the bed of metal pieces, and the contact time between the nitric acid and the metal pieces is sufficient to form the metal nitrate;

(C) maintaining the temperature within the reactor at a temperature sufficient to maintain the metal nitrate in the molten state;

(D) maintaining the pressure within the reactor at between about atmospheric pressure up to about 100 psig; and (E) recovering the metal nitrate from the bottom opening of the reactor, provided that when the metal is iron, any recovered iron nitrate is not recycled.

25. The process of claim 24 wherein the metal is nickel or cobalt.

26. The process of claim 24 wherein the reactor is a vertical tubular reactor.

27. The process of the claim 24 wherein the aqueous nitric acid solution comprises at least 60% by weight of nitric acid.

28. The process of claim 24 wherein the aqueous nitric acid solution comprises about 65% to about 70% by weight of nitric acid.

29. The process of claim 24 wherein the pressure within the reactor is about atmospheric pressure.

30. The process of claim 24 wherein the pressure within the reactor is from about atmospheric pressure up to about 50 psig.

31. The process of claim 24 wherein the temperature within the reactor is maintained at about 60° C. to about 90° C.

32. The process of claim 24 wherein the height of the bed of metal in the reactor is from about 2 to about 20 feet.

33. The process of claim 24 wherein the height of the bed of metal in the reactor is from about 10 to 12 feet.

34. The process of claim 24 conducted in the presence of air.

35. The process of claim 26 wherein the nickel nitrate or cobalt nitrate obtained has an average adjusted ammonia concentration of less than about 500 ppm.

36. The process of claim 26 wherein the nickel nitrate or cobalt nitrate obtained has an average adjusted ammonia concentration of less than about 100 ppm.

37. The process of claim 24 wherein water is added to the metal nitrate formed in the reactor at the bottom of the reactor or below the bed of the metal in the reactor to form a metal nitrate solution and minimize crystallization of the metal nitrate.

38. The process of claim 37 wherein the metal nitrate solution obtained contains 10% by weight or less of nitric acid.

39. A continuous process for preparing metal nitrates containing reduced amounts of ammonium nitrate from the corresponding metal wherein the metal is nickel or cobalt which comprises:

(A) providing a vertical reactor having a top opening and a bottom opening wherein the reactor contains a bed of pieces of the metal;

(B) feeding an aqueous nitric acid solution which is free of nickel nitrate hexahydrate when the metal is nickel and which contains from about 50% to about 80% nitric acid into the top opening of the reactor whereby the nitric acid flows through the bed of metal pieces and the contact time between the nitric acid and the metal pieces is sufficient to form the metal nitrate;

(C) maintaining the temperature within the reactor at a temperature sufficient to maintain the metal nitrate in the molten state;

(D) maintaining the pressure within the reactor at between about atmospheric pressure up to about 50 psig; and (E) recovering the metal nitrate from the bottom opening of the reactor.

40. The process of claim 39 wherein the metal is nickel.

41. The process of claim 39 wherein the metal is cobalt.

42. The process of claim 39 wherein the reactor is a vertical tubular reactor.

43. The process of the claim 39 wherein the aqueous nitric acid solution comprises at least 60% by weight of nitric acid.

44. The process of claim 39 wherein the aqueous nitric acid solution comprises from about 65% to about 70% by weight of nitric acid.

45. The process of claim 39 wherein the nitric acid fed to the reactor is free of added nitrous acid or material that form nitrous acid.

46. The process of claim 39 wherein the pressure within the reactor is about atmospheric pressure.

47. The process of claim 39 wherein the temperature within the reactor is maintained at about 60° C. to about 90° C.

48. The process of claim 39 wherein the height of the bed of metal in the reactor is from about 2 to about 20 feet.

49. The process of claim 39 wherein the height of the bed of metal in the reactor is from about 10 to 12 feet.

50. The process of claim 39 wherein the nickel nitrate or cobalt nitrate obtained has an average adjusted ammonia concentration of less than about 500 ppm.

51. The process of claim 39 wherein water is added to the nickel nitrate or cobalt nitrate formed in the reactor at the bottom of the reactor or below the bed of the metal in the reactor to form a metal nitrate solution and minimize crystallization of the metal nitrate.

52. The process of claim 51 wherein the metal nitrate solution obtained contains less than about 5% of nitric acid.

* * * * *